Nov. 5, 1929.   O. V. KRUSE   1,734,733
VALVE
Filed Jan. 27, 1922   2 Sheets-Sheet 1
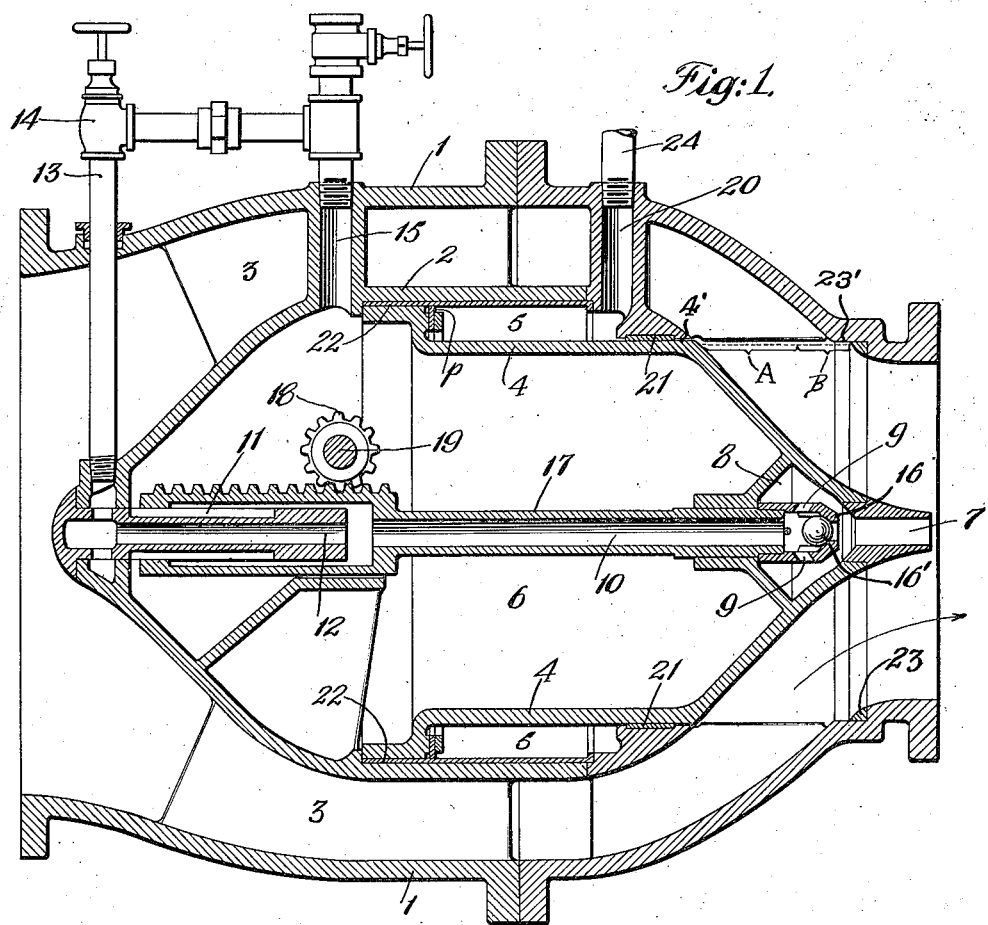
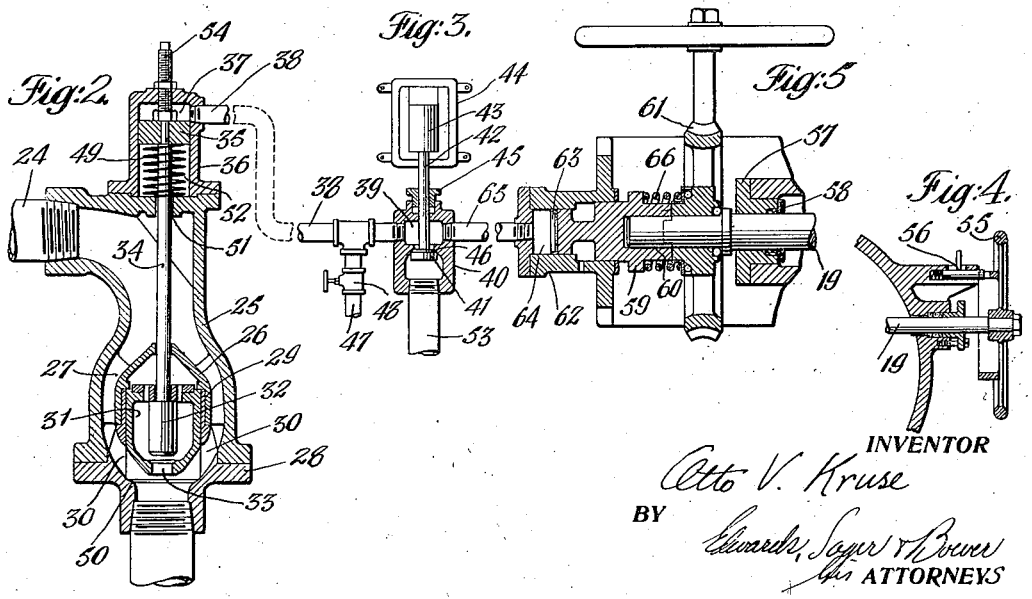
INVENTOR
Otto V. Kruse
BY
Edwards, Sager & Brewer
his ATTORNEYS Nov. 5, 1929.   O. V. KRUSE   1,734,733
VALVE
Filed Jan. 27, 1922   2 Sheets-Sheet 2
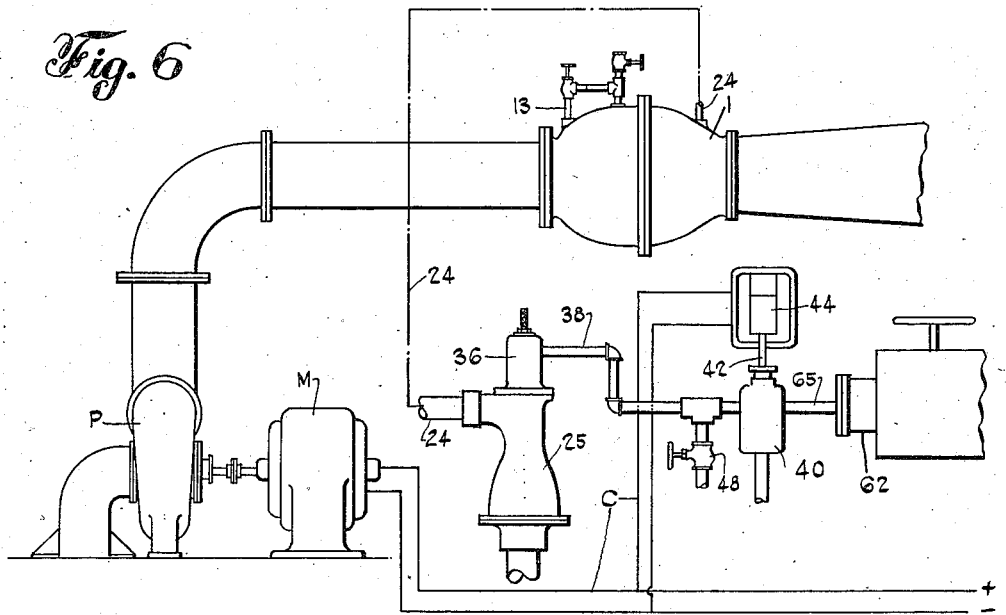
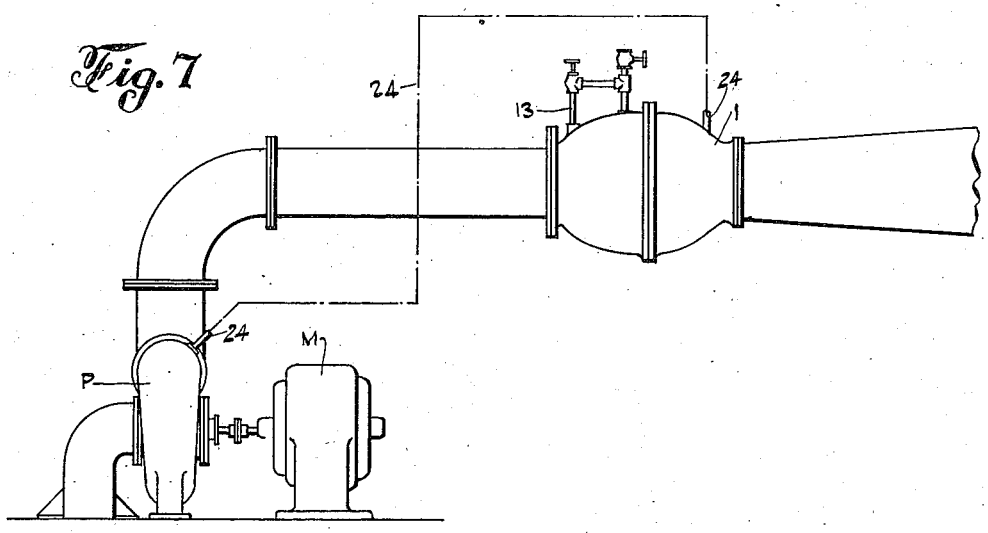
INVENTOR
Otto V. Kruse
BY
Edward M. Hathaway
ATTORNEY Patented Nov. 5, 1929

1,734,733

UNITED STATES PATENT OFFICE

OTTO V. KRUSE, OF NARBERTH, PENNSYLVANIA, ASSIGNOR, BY MESNE ASSIGNMENTS, TO I. P. MORRIS CORPORATION, A CORPORATION OF DELAWARE

VALVE

Application filed January 27, 1922. Serial No. 532,100.

This invention relates to valves and particularly to valves acting to stop or throttle flow in one direction and to automatically check flow in the reverse direction. Such valves are frequently desirable in connection with installations where it is necessary to check reverse flow as for instance where centrifugal pumps deliver water against pressure to a storage reservoir. These pumps are usually motor driven and if for any reason the power fails and reverse flow is set up then the pump acts as a turbine to drive the motor as a generator. It is highly desirable to prevent this result by checking the reverse flow or closing the check valve in advance of the reversal and the object of this invention is to provide a valve structure and automatic control means which while not interfering with the regular use of the valve as a throttling means will automatically close the valve as soon as conditions are such as to cause a reversal of the flow.

Further objects of the invention particularly in connecting the valve control to be automatically actuated from a remote point will appear from the following description taken in connection with the accompanying drawings in which Fig. 1 is a vertical sectional view of a valve, and Fig. 2 is a vertical sectional view of a control valve for the main valve shown in Fig. 1.

Fig. 3 is a sectional view of control mechanism for actuating the control valve of Fig. 2.

Fig. 4 is a sectional view showing a hand wheel operating means for the main valve of Fig. 1, and Fig. 5 is a vertical sectional view of a modified form of hand wheel operating means.

Figs. 6 and 7 are diagrammatic assembly views of the pumping system and control therefor.

In the specific embodiment of the invention shown in the drawings a valve body 1 and an internal cylinder 2, the latter being connected to the valve body by radial ribs 3 to form a fluid way therebetween. A plunger 4 is arranged to slide in the internal cylinder 2. The front end of the internal cylinder is smaller in diameter than the back end, thus forming an annular chamber 5. A central chamber 6 lies inside the plunger and the internal cylinder. The annular and internal chambers are separated by an annular piston member on plunger 4. An orifice 7 is located in the nose of the plunger, providing communication between the water passage beyond the valve and chamber 8. Ports 9, passage 10 and passages 11 provide a means of communication between chamber 8 and chamber 6. This means of communication exists throughout stroke A. A second means of communication between chambers 8 and 6 is present throughout the entire stroke of the plunger by means of ports 9, passage 10, passage 12, pipe 13, throttling valve 14 and port 15. A pilot valve 16 is provided for closing orifice 7. The pilot valve is fastened to a hollow shaft 17 which has teeth cut on it at the back end, forming a rack. A pinion 18 is attached to a shaft 19, the pinion engaging the rack at the back end of shaft 17.

The normal direction of flow through the valve is as indicated by the arrow. When operating as an ordinary stop valve or a throttle valve the pressure in annular chamber 5 is the same as the pressure in the water passage between the body and the internal cylinder. In other words, port 20 may be omitted as far as stop valve operation is concerned and the leakage space 21 between the front end of the internal cylinder and the plunger will provide communication for maintaining the pipe line pressure in chamber 5. The valve plunger is shown in the open position and assuming that flow exists through the valve, the closing of the valve is performed by moving shaft 19 and in this manner moving shaft 17 by means of the rack and pinion until pilot valve 16 closes or nearly closes orifice 7. This will allow pressure to be built up in chamber 6 through leakage space 22 at the back end of the plunger. The pressure in chamber 6 will hold ball check 16' to its seat and increase to a point where the total force tending to close the plunger is equal to the forces against the nose of the plunger which tend to keep it open. The plunger is now in a state of balance and a slight increase of pressure in chamber 6, due to a further tendency of pilot valve 16 to cut off orifice 7, will tend to move the plunger forward. The plunger will continue to move toward the closed position as long as pilot valve 16 is moved to throttle orifice 7. In this manner the plunger is closed, seating against ring 23 and the flow of water is cut off from the piping beyond the valve. Before the plunger 4 reaches its seat ring 23 the end 4′ slides into the cylindrical recess 23′ formed in the casing adjacent the seat ring 23 and shuts off, or reduces, the flow before the plunger movement is finished. As the flow is thus cut off by the overlapping of 4′ and 23′ the pressure on the downstream face of the plunger is lost and the plunger motion will be accelerated, the plunger moving away from pilot valve 16 until the discharge through 7 is augmented sufficiently to drop the pressure in chamber 6 and balance the plunger. The plunger is seated against 23 by a further movement of pilot valve 16. By providing the recess 23′ of sufficient length the momentary acceleration of the plunger can take place without danger of the plunger striking a blow against the seat 23. The formation of the recess 23′ as a groove in the casing wall avoids any undesirable protuberance in the waterway and provides a space and retaining shoulder for the seat ring 23. It is obvious that by varying the form of recess 23′ the flow may be cut off either suddenly or gradually as may be desired.

Assuming that pressure exists in the valve body and a lower pressure or an empty pipe line is present beyond the valve, the opening stroke of the plunger is performed by moving control valve 16 away from the orifice and in this way discharging pressure from chamber 6. It will be noted that for the portion B of the stroke of the plunger the communication between orifice 7 and chamber 6 is established through ports 9, passage 10, passage 12, pipe 13, throttle valve 14 and port 15. As mentioned previously, the communication between orifice 7 and chamber 6 for the portion A of the plunger stroke is established through ports 9, passage 10 and passages 11. Throughout both the opening and closing strokes the plunger will adjust itself, in relation to the control valve 16, in such a way that it can be stopped at any point in the stroke between wide open and closed and will maintain itself indefinitely in this position in a state of hydraulic balance. A packing ring $p$ is provided on the front of the piston of plunger 4 engaging against the shoulder $s$ of cylinder 2 when the plunger valve is closed so as to prevent leakage of pressure from chamber 6 to chamber 5.

The essential feature of this design is the ability of the valve to close automatically and prevent reversal of flow in the pipe line. At the same time, the valve may be used as a stop valve or as a throttling valve as above described. When used as an automatic closing valve against reversal of flow the actual closing motion of the plunger may be performed automatically in three different ways, as follows:

If it is desired to begin the closing stroke of the plunger after reversal of flow has taken place the first effect of reversal of flow is felt at the orifice 7 and the impinging of the stream on this orifice in the direction opposite to the arrow opens ball check 16′ and builds up a hydraulic pressure in chamber 6 exceeding the forces exerted against the nose of the plunger. The plunger will therefore move toward its closed position for a distance equal to stroke A at a relatively rapid rate, as free communication is present by virtue of passages 11. At the end of stroke A passages 11 are cut off and the balance of the closing stroke or portion B is adjustable by virtue of throttle valve 14. In other words, plunger 4 can close only as fast as the required displacement of water is admitted to chamber 6. The actual percentage of the plunger stroke shown by A depends entirely on the characteristics of the individual installation. In some instances the plunger may be moved rapidly for practically the entire stroke and then slowly simply to cushion the final closure. In other cases it is desirable to close the plunger only for perhaps half of its stroke rapidly and the balance of its stroke slowly.

The second method of performing automatic closure of the valve against reversal of flow might best be illustrated by a typical installation of such a valve in the discharge line of an electrically driven centrifugal pump such as shown in Fig. 6 wherein motor "M" drives centrifugal pump "P". Whenever a power interruption occurs the pump stops and a drop of pressure exists in the pump casing very quickly after such an interruption. The drop of pressure will precede the actual reversal of flow and this characteristic may be utilized to begin the closing stroke of the plunger before reversal of flow takes place. For example, port 20 which communicates with annular chamber 5 may be connected directly to the casing of pump P by means of pipe 24 as shown in Fig. 7. As soon as a drop of pressure exists in the pump casing a similar drop will exist in annular chamber 5 and this will tend to begin the closing stroke of the plunger by virtue of the higher pressure which exists in chamber 6. As soon as the drop of pressure has resulted in a reversal of flow the balance of the closing stroke of the plunger will be performed as described above. The virtue of this arrangement is that the closing stroke of the plunger will be commenced shortly before the method first described, as the plunger will respond to a drop in pressure in the pump casing and will not wait until actual reversal of flow has taken place before it begins its closing stroke.

The third method of performing the closing stroke of the plunger automatically can best be illustrated by the same installation referred to in the second method and which is diagrammatically shown in Fig. 6 and also in detail in the previous figures. The pipe 24 connecting to port 20 instead of going directly to the pump casing may be equipped with a remote control release or blow-off valve which will provide a means for exhausting the pressure in pipe 24 and hence in annular chamber 5 to the atmosphere. A blow-off valve which would be well suited for this service is shown in Fig. 2. Pipe 24 is shown on this figure leading into the entrance end of a piston operated plunger valve. This plunger valve consists of a body 25 and an internal cylinder 26, the latter being joined to the body by means of radial ribs 27. The outlet portion of the valve 28 is joined to a liner 29 for the internal cylinder by means of ribs 30. The plunger 31 is free to move in liner 29. Pilot valve 32 is provided for opening or closing orifice 33 in plunger 31. The pilot valve is operated by stem 34 to which it is fastened. A piston 35 is attached to the top of stem 34, this piston being guided by cylinder 36.

Whenever plunger 31 is opened pressure is discharged from pipe 24 and hence from annular chamber 5. In order to open plunger 31 it is necessary to exhaust pressure from chamber 37 above piston 35. The exhaust of this pressure is accomplished through pipe 38.

In Fig. 3 it will be noted that pipe 38 leads into chamber 39 in the top part of disc valve body 40. Disc valve 41 is attached to stem 42 which in turn is fastened to the moving element 43 of an electrically operated solenoid 44. Stem 42 passes through a stuffing box 45 to prevent leakage around the stem. Electric solenoid 44 is connected to the electrical circuit diagrammatically indicated at C in Fig. 6 which supplies power to the motor driven centrifugal pump above referred to. Whenever power exists and the motor driven pump is in service power also is supplied to electric solenoid 44 and in this manner holds disc 41 against its seat 46. A pipe 47 is connected to a source of hydraulic pressure such as the main valve body 1. A throttle valve 48 is provided in this pipe. When disc 41 is against its seat 46 the pipe line pressure exists in chamber 39 and pipe 38 by virtue of its connection through pipe 47 to the valve body. Since pipe line pressure exists in pipe 38 the same pressure will exist in chamber 37. With pressure in chamber 37 pilot valve 32 is forced to its closed position by virtue of its exposed end area equivalent to the area of orifice 33. Under these conditions, plunger 31 will close against its seat 50 and hence full pipe line pressure will exist in pipe 24 and annular chamber 5. It will be noted that pipe line pressure also exists in chamber 49 below piston 35 by virtue of leakage space 51 surrounding stem 34.

A spring 52 is shown in chamber 49. This spring tends to open pilot valve 32, but the hydraulic pressure exerted on the exposed end area of pilot valve 32 is considerably greater than the force of spring 52 and therefore the pilot valve will remain closed.

Referring again to Fig. 3 if an interruption should occur in the power supply to the pumps the same interruption would be felt at solenoid 44 at the same instant. When the power is cut off from solenoid 44 the hydraulic pressure in chamber 39 opens valve disc 41. The instant this occurs pressure is discharged from chamber 39, pipe 38 and chamber 37 to drain 53. Pressure is admitted at the same time through pipe 47, but throttle valve 48 is provided to choke the flow from pipe 47 and hence the drop in pressure by the opening of disc 41 will be effective in spite of the supply of pressure through pipe 47. The drop of pressure which occurs in chamber 37 by virtue of the opening of disc 41 instantly allows the pressure in chamber 49 to open pilot valve 32. Plunger 31 follows pilot valve 32. The opening of plunger 31 exhausts pressure from pipe 24 and hence from annular chamber 5. Spring 52 is provided to insure the maintenance of plunger 31 in the open position even after the pressure in pipe 24 is reduced to practically atmospheric pressure. The exhaust of pressure from annular chamber 5 causes plunger 4 to begin its closing stroke as previously described. The closing stroke of the plunger in this case may actually be nearly complete before reversal of flow takes place. Jack screw 54 is provided to limit the opening of pilot valve 32 and hence the opening of plunger 31, and in this manner provide a means of controlling to some extent the portion A of the plunger stroke.

In this third method of operating the plunger the beginning of the closing stroke occurs simultaneously with the power interruption, without waiting for a drop in pressure in the pump casing or without waiting for the subsequent reversal of flow. When power is again supplied to the pump it is also supplied to solenoid 44. This raises disc 41 and allows pressure to again be established in chamber 39, pipe 38 and chamber 37, this pressure being supplied through pipe 47. Whenever pressure is re-established in chamber 37, pilot valve 32 and hence plunger 31 are closed.

A characteristic of this type of check valve is that hollow shaft 17 moves whenever plunger 4 moves. In other words, shaft 17 is actually pulled by the plunger when it is operating as an automatic closing valve. This means that pinion 18 and shaft 19 are rotated by virtue of their being connected to the rack which is cut on shaft 17. Since shaft 19 is rotated there must be no interference on the part of the mechanical mechanism on the outside of the valve body to prevent this rotation. One method of accomplishing this is shown in Fig. 4. In this case, which applies to the smaller sizes of valves, a hand wheel 55 is mounted directly on the pinion shaft 19 and is locked in the wide open position by means of a small spring latch 56. When the valve is wide open there is only a very slight tendency for it to close, hence, a spring latch such as 56 would be adequate. Whenever reversal of flow takes place the forces exerted to close the valve plunger are relatively great and as soon as this force is applied to shaft 19 and hence to hand wheel 55 the spring latch 56 would be thrust out of position and the valve would be free to close without further interference.

It is also possible to use the ordinary worm and worm wheel gearing on the outside of pinion shaft 19 provided a means of unlocking the pinion shaft from the gearing is used. This unlocking function should be automatically performed whenever there is a tendency for the valve to close aganist reversal of flow. Fig. 5 shows a section through the pinion shaft with this unlocking device. The valve body 1, internal cylinder 2 and ribs 3 are as in Fig. 1 with the pinion shaft 19 passing through the waterway between internal cylinder 2 and body 1. A stuffing box 57 with cup leather 58 prevents leakage around shaft 19. A clutch element 59 is fastened to shaft 19 by means of key 60 so that element 59 rotates whenever shaft 19 rotates. Element 59 is free to move laterally along shaft 19 in order to engage or disengage with a similar clutch element on worm wheel 61. Worm wheel 61 is loose on shaft 19. Whenever clutch element 59 is engaged with similar clutch element on worm wheel 61 the worm wheel can be rotated and thus element 59 and shaft 19 will be rotated, as is required for the ordinary stop and throttle valve action. Whenever the clutch is disengaged by the lateral motion to the left of element 59, worm wheel 61 will remain stationary, while shaft 19 and element 59 are free to rotate, as is required when the valve is operating to close against reversal of flow. A bearing 62 is attached to valve body 1 and serves to guide element 59 both in its lateral and rotary motions. The portion of element 59 opposite to the clutch is provided with a cup leather 63 which forms with bearing 62 a piston and cylinder element. Chamber 64 in front of the piston communicates with pipe line pressure by means of pipe 65. When pipe line pressure exists in chamber 64 the clutch is engaged and the valve is in service as a stop and throttle valve. When pressure is exhausted from chamber 64 the clutch is disengaged by virtue of the force supplied by spring 66, this spring tending to force apart the two clutch elements.

Chamber 64 is connected to chamber 39 by means of pipe 65, hence, when a power interruption occurs the pressure is exhausted from chamber 64 in the same manner that it is exhausted from chamber 37 of the blow-off valve from the annular chamber 5. It is therefore seen that the clutch will disengage the pinion shaft 19 from the worm gearing at the same instant that pressure begins to be exhausted from annular chamber 5. Also, when power is re-established to the pump motors and to the solenoid, hydraulic pressure is again supplied to engage the clutch, at the same instant that it is used to close the blow-off valve from the annular chamber. The ball bearings shown on either side of worm wheel 61 are simply provided to take the thrust of the spring and prevent undue friction.

In the above described structure the discharge of pressure from chamber 64 of the clutch mechanism is accomplished through pipe 65 which leads direct to the solenoid operated disc valve. In case the solenoid operation is not used, this pipe 65 would lead direct to the pump casing the same as pipe 24 which connects the annular chamber of the valve with the pump casing. The drop of pressure in the pump casing will then serve to disengage the clutch the same as though the discharge of pressure were accomplished through the solenoid operated valve. This would also apply to the first method described for automatic closure. Of course, in this case the pipe from the annular chamber does not exist and only pipe 65 would lead to the pump casing.

While this invention has been described in connection with specific embodiments it is not confined thereto but is intended to cover such modifications thereof as fall within the scope of the appended claims.

I claim:—

1. The combination in a valve mechanism comprising a valve casing, a movable valve element disposed therein and adapted to control fluid flow therethrough, means for actuating said valve element in opposite directions including fluid pressure opening and closing chambers, and means for automatically controlling fluid pressure in said chambers to close said valve element when operating conditions are such as to permit reversal of flow through said valve, said automatic means comprising a remote control release valve for said fluid pressure.

2. The combination in a valve mechanism comprising a valve casing, a movable valve element disposed therein and adapted to control fluid flow therethrough, actuating means for moving said valve element in opposite directions including fluid pressure opening and closing chambers, and means for automatically controlling fluid pressure in said chambers to close said valve element when operating conditions are such as to permit reversal of flow through said valve, said automatic means including a solenoid operated means for controlling said valve actuating means.

3. A valve mechanism for a conduit comprising a casing and a movable valve element disposed therein adapted to control fluid flow therethrough, means for actuating said valve element including opening and closing fluid pressure chambers, and means controlling fluid flow relative to said chambers including a fluid passage having a control valve disposed therein, and a solenoid for effecting a closing operation of said control valve automatically in advance of reversal of flow in said conduit and adapted when energized to effect opening of said conduit valve.

4. The combination comprising a conduit having a movable valve element therein for controlling fluid flow therethrough, an electrically-driven hydraulic pump for pumping fluid through said conduit, and means controlled by the current supply thereto for initiating movement of said valve element to its closed position automatically when current supply to said electrically-driven pump fails.

5. The combination comprising a conduit having a movable valve element therein for controlling fluid flow therethrough, an electrically-driven hydraulic pump for pumping fluid through said conduit, and means for moving said valve element to its closed position automatically when current supply to said electrically-driven pump fails, said means including a solenoid controlled member.

6. The combination comprising a conduit having a movable valve element therein for controlling fluid flow therethrough, means for actuating said valve element including fluid pressure opening and closing chambers, an electrically-driven hydraulic pump for pumping fluid through said conduit, and means for effecting closing movement of said valve element automatically when current supply to said electrically-driven pump fails, said means including a control valve for controlling the fluid in at least one of said chambers, and a solenoid for controlling said control valve and adapted to be operated automatically in accordance with the supply of current to said electrically-driven pump.

7. The combination comprising a conduit having a movable valve element disposed therein for controlling fluid flow therethrough, an electrically-driven hydraulic pump for pumping fluid through said conduit, means whereby said valve element is adapted to be disposed in a partially closed or throttling position, and means for automatically effecting complete closure of said valve element from said position when the current supply to said electrically-driven pump is interrupted, said means including a solenoid which is energized and de-energized in accordance with the supply of current to said pump.

8. The combination comprising a conduit having a movable valve element disposed therein for controlling fluid flow therethrough, means for actuating said valve including a piston and fluid pressure opening and closing chambers associated therewith, an electrically-driven centrifugal pump for pumping fluid through said conduit, means whereby said movable valve element is adapted to be disposed in a partially closed or throttling position, and means for automatically effecting complete closure of said valve element from said position when the current supply to said electrically-driven pump is interrupted, including a control valve for controlling the fluid pressure in at least one of said chambers and a solenoid for effecting operation of said control valve automatically in accordance with the supply of current to said electrically-driven pump.

9. The combination as set forth in claim 8, further characterized by having said control valve operated by fluid pressure, and means for controlling the fluid pressure therefor by said solenoid.

10. The combination comprising a conduit having a valve mechanism provided with a movable valve element for controlling the flow through said conduit, fluid actuating means for said valve element including fluid pressure opening and closing chambers, an electrically-operated centrifugal pump for propelling fluid through said conduit, and means for controlling the fluid operation of said actuating means including a solenoid automatically energized in accordance with the supply of current to said electrically-operated pump, and a controlling element operated by spring pressure when said solenoid is de-energized.

11. The combination comprising a conduit having a valve mechanism with a movable valve element for controlling flow through said conduit, manual means for closing said valve, means for also automatically closing said valve when operating conditions are adapted to permit reverse flow through said conduit, and means whereby said automatic operation is adapted to render said manual control inoperative.

12. In a valve, the combination with a conduit, of a movable valve element for controlling fluid flow therethrough, and means for moving said valve and holding it at various degrees of opening including means for automatically beginning the closing of said valve in advance of reversal of flow in said conduit and continuing said movement until said valve is closed.

13. The combination set forth in claim 12 further characterized by having the valve moving means include fluid pressure opening and closing chambers.

14. The combination with a main valve mechanism having a movable valve member for controlling fluid flow through a conduit, of opening and closing fluid pressure chambers having a fluid operated piston element interposed therebetween and operatively connected to said valve member for moving the same in either of opposite directions, passage forming means for conducting operating fluid relative to each of said chambers during operation of the valve, control valve mechanism adapted, during closing of the main valve, to have operating fluid from said opening chamber discharged therethrough, and means for operating said control valve and initiating closing movement of said main valve automatically upon occurrence of reverse flow conditions in said conduit.

15. The combination with a main valve mechanism having a movable valve member for controlling fluid flow through a conduit, of opening and closing fluid pressure chambers having a fluid operated piston element interposed therebetween and operatively connected to said valve member for moving the same in either of opposite directions, and means for closing said main valve automatically upon occurrence of reverse flow conditions in said conduit, including valvular means for controlling the operating fluid in at least the opening one of said chambers.

16. The combination with a main valve mechanism having a movable valve member for controlling fluid flow through a conduit, of opening and closing fluid pressure chambers having a fluid operated piston element interposed therebetween and operatively connected to said valve member for moving the same in either of opposite directions, and means for closing said main valve automatically upon occurrence of reverse flow conditions in said conduit, including valvular means for controlling the operating fluid in at least the opening one of said chambers, and a passage having an open end extending down-stream within said conduit whereby upon reverse flow therein the velocity head of the reverse flow is converted into pressure head within said passage thereby to effect closure of said main valve.

17. The combination with a valve body tapering at one end, of a valve plunger seating there against, a cylinder in which said plunger slides, and means for controlling the movement of said plunger comprising a hollow rod member connected to said plunger at one end and at its other end having an automatically variable fluid connection with the interior chamber between said cylinder and said plunger.

18. The combination with a valve body tapering at one end, of a valve plunger seating there against, a cylinder in which said plunger slides, and means for controlling the movement of said plunger comprising a hollow rod member connected to said plunger at one end and at its other end having an automatic variable fluid connection with the interior chamber between said cylinder and said plunger and an auxiliary adjustable connection between the interior of said rod and said chamber.

19. The combination with a valve body tapering at one end, of a valve plunger seating there against, a cylinder in which said plunger slides, and means for controlling the movement of said plunger comprising a hollow rod member connected to said plunger at one end and at its other end having provision to slide on a stationary hollow rod member and to provide an automatically variable connection between the interior of said rod and the interior chamber between said cylinder and plunger.

20. In a valve the combination with a conduit having a smooth tapering contraction, of a conical valve plunger movable in the direction of the conduit axis and being disposed substantially centrally in the said conduit thereby forming a smooth fluid way with said tapering contraction and adapted to seat against the surface of said contraction to close said conduit, and means for moving said valve in the direction of normal flow during closing comprising means for automatically beginning the closing of said valve in advance of reversal of flow in said conduit and continuing said movement until said valve is closed.

21. The combination with a hydraulic conduit having a downstream portion, of a hollow plunger check valve movable in the direction of the conduit axis for controlling the fluid flow therethrough, fluid valve actuating means, and controlling means therefor adapted automatically to permit initial movement of said valve without necessitating reversal of conduit flow or a flow velocity above normal in said downstream portion, said controlling means being effective to continue said movement until said valve is closed.

22. The combination with a hydraulic conduit having a downstream portion, of a hollow plunger check valve movable in the direction of the conduit axis mechanism having a movable valve element adapted to shut off flow therethrough, piston and cylinder elements for actuating the same, means for subjecting opposite sides of said piston simultaneously to fluid pressure, and means for releasing pressure on one side thereof, including controlling means adapted automatically to be rendered operative without necessitating the reversal of conduit flow or a flow velocity above normal in said downstream portion.

23. In a valve the combination with a conduit having a tapering contraction, of a conical valve plunger forming a smooth fluid way with said tapering contraction and adapted to seat against the surface of said contraction to close said conduit, and means for moving said valve and holding it at various degrees of opening comprising means for automatically beginning the closing of said valve in advance of reversal of flow in said conduit and continuing said movement until said valve is closed.

24. In a valve the combination with a conduit having a tapering contraction, of a conical valve plunger forming a smooth fluid way with said tapering contraction and adapted to seat against the surface of said contraction to close said conduit, and fluid pressure operated means for moving said valve and holding it at various degrees of opening comprising means for automatically beginning the closing of said valve in advance of reversal of flow in said conduit and continuing said movement until said valve is closed.

25. In a valve the combination with a conduit having a tapering contraction, of a hollow casing in said conduit, a conical valve plunger having telescopic relation with said casing, said plunger and casing forming a smooth fluid way with said tapering contraction and adapted to seat against the surface of said contraction to close said conduit, and means for moving said valve comprising means for automatically beginning the closing of said valve at a variable rate in advance of reversal of flow in said conduit and continuing said movement until said valve is closed.

26. In a valve the combination with a conduit having a tapering contraction, of a conical valve plunger forming a smooth fluid way with said tapering contraction and adapted to seat against the surface of said contraction to close said conduit, and means for moving said valve comprising means for automatically beginning the closing of said valve in advance of reversal of flow in said conduit and automatically retarding the end of the closing movement.

27. In a valve the combination with a conduit having a tapering contraction, of a conical valve plunger forming a smooth fluid way with said tapering contraction and adapted to seat against the surface of said contraction to close said conduit, and means for automatically beginning the closing of said valve in advance of the reversal of flow and continuing said movement until said valve is closed comprising a fluid passage from the valve to a point remote therefrom.

28. In a valve the combination with a conduit having a tapering contraction, of a conical valve plunger forming a smooth fluid way with said tapering contraction and adapted to seat against the surface of said contraction to close said conduit, and means for automatically beginning the closing of said valve in advance of the reversal of flow and continuing said movement until said valve is closed comprising a fluid passage from the valve to a point remote therefrom, said passage being so disposed as to increase the closing pressure on said valve in advance of reversal of the flow.

29. In a valve the combination with a conduit, of a cylindrical body therein, a valve plunger sliding in said body to seat against a portion of said conduit, means for moving said valve comprising a differential piston and means for automatically beginning the closing of said valve in advance of reversal of the flow and continuing said movement until said valve is closed comprising connections to a point remote from said valve adapted to bring a closing pressure to bear on said piston.

30. In a valve the combination with a conduit body having a tapering wall, of a tapering valve plunger forming a smooth passage therewith, power means for applying pressure to close said valve, means for automatically closing said valve by a change in the fluid pressure in said conduit, and means for disconnecting said power means during said automatic operation.

31. In a valve the combination with a conduit body having a tapering wall, of a tapering valve plunger forming a smooth passage therewith, power means for applying pressure to close said valve, means for automatically closing said valve by a change in the fluid pressure in said conduit and means for automatically disconnecting said power means during said automatic operation.

32. In a valve the combination with a conduit body having a tapering wall, of a tapering valve plunger forming a smooth passage therewith, power means for closing said valve, means for automatically closing said valve and means for automatically disconnecting said power means during said automatic operation comprising a clutch member and fluid pressure operating means therefor.

33. In a valve the combination with a conduit body having a tapering wall, of a tapering valve plunger forming a smooth passage therewith, power means for closing said valve, means for automatically closing said valve, and means for automatically disconnecting said power means during said automatic operation comprising a clutch member and fluid pressure operating means therefor adapted to relieve said clutch by a drop of pressure in said conduit.

34. In a valve the combination with a conduit body having a tapering wall, of a tapering valve plunger forming a smooth waterway with said wall, fluid pressure operated means for moving said valve, and means for automatically controlling said fluid pressure to close said valve upon reversal of flow comprising a remote control release valve for said fluid pressure.

35. In a valve the combination with a conduit body having a tapering wall, of a tapering valve plunger forming a smooth passage therewith, power means for applying pressure to close said valve, means for automatically closing said valve by a change in the fluid pressure in said conduit, and means for releasing said power means for operation during said automatic operation.

36. In a flow control system the combination with an outer casing for a conduit, of an inner hollow cylindrical member in fixed position with relation to said casing, a plunger element slidably mounted with relation to said fixed member and having an end portion seating against said conduit casing, the fixed member and plunger being formed to provide a central chamber and an annular chamber, partition means forming a separate chamber at one portion of said plunger, a longitudinally movable member having a valve at one end controlling a connection to said separate chamber to vary the fluid pressure on said plunger, and means at the other end of said longitudinally movable member for controlling a fluid pressure connection to the interior of said fixed member automatically upon movement of said longitudinally movable member.

37. In a flow control system the combination with an outer casing for a conduit, of an inner hollow cylindrical member in fixed position with relation to said casing, a plunger element slidably mounted with relation to said fixed member and having an end portion seating against said conduit casing, the fixed member and plunger being formed to provide a central chamber and an annular chamber, adapted to be connected to atmosphere, partition means forming a separate chamber at one portion of said plunger, a longitudinally movable member having a valve at one end controlling a connection to said separate chamber to vary the fluid pressure on said plunger, and means at the other end of said longitudinally movable member for controlling a fluid pressure connection to the interior of said fixed member, in an extreme position of the longitudinally movable member.

38. In a valve structure a tapered casing having a valve seat, and a sliding hollow plunger cooperating therewith and having its interior connected to the water way through said casing, including an orifice in said plunger, a pilot valve adapted to control fluid flow through said orifice, and a groove in the interior of said casing having a surface substantially slidably engageable with said plunger to reduce the flow through the water way before the plunger engages said seat and reduce the pressure below the valve and correspondingly reduce the pressure within the valve plunger by automatically effecting opening movement of said pilot when said plunger enters said cylindrical recess.

39. In a valve structure a tapered casing having a valve seat, and a sliding hollow plunger cooperating therewith and having its interior connected to the water way through said casing, including an orifice in said plunger, a pilot valve adapted to control fluid flow through said orifice, and a groove in the interior of said casing having a cylindrical surface substantially slidably engageable with said plunger to reduce the flow through the water way before the plunger engages said seat and reduce the pressure below the valve and correspondingly reduce the pressure within the valve plunger by automatically effecting opening movement of said pilot when said plunger enters said cylindrical recess.

40. A valve mechanism comprising a casing having an inlet and outlet whose axes are substantially in alignment, said outlet having a seat, a movable plunger disposed substantially in alignment with said axes and adapted to engage said seat, means forming opening and closing fluid-pressure chambers spaced from the fluid way in said casing and adapted to move said valve to open and closed positions, and ported supplemental means adapted to impart an additional opening force thereto.

41. A valve mechanism comprising a casing having a seat, a movable plunger adapted to engage said seat, and fluid actuated means for moving said valve to open and closed positions, and supplemental means adapted to impart an additional opening force thereto, said supplemental means having a passageway adapted also to conduct actuating fluid pressure to said fluid actuated means from the downstream side of said valve.

42. A hydraulic valve mechanism adapted to allow water to flow therethrough in a smooth stream line comprising a casing having a seat, a plunger for engaging said seat, means forming fluid-pressure opening and closing chambers for positively moving said plunger in opposite directions by fluid pressure, and mechanical means for also moving said plunger, said fluid and mechanical means having a common controlling element which is adapted to effect said mechanical movement in opposite directions.

43. A valve mechanism comprising a casing adapted for cooperation with a conduit, a valve plunger movably supported thereby and provided with a chamber, and means for moving said plunger, comprising oppositely spaced and relatively fixed portions forming a chamber adapted to be separated from said other chamber, a member relatively movable to said plunger and having means alternatively engageable with said fixed portions, said member having a passage whereby one of said chambers has a fluid connection communicating with the downstream side of said valve conduit.

44. A valve mechanism comprising a casing having a valve seat, a valve plunger for engaging said seat provided with a chamber, and means for actuating said plunger, comprising oppositely spaced and relatively fixed members carried by said plunger to form another chamber adapted to be entirely separated from said other chamber, a member movable relative to said plunger and adapted to engage alternatively said opposed portions, means to control variable communication between said chambers, throttling means adapted to supplement said variable control, and means for positively controlling said member.

45. A valve mechanism for a fluid conduit comprising a casing having a valve seat, a valve plunger for engaging said seat, and means for actuating said plunger, comprising oppositely spaced and relatively fixed members carried by said plunger, a member movable relative to said plunger and adapted to engage alternatively said opposed portions, means for positively controlling said member, and means for actuating said plunger by fluid pressure, including a fluid passage extending through said member and communicating with the downstream side of the conduit.

46. The combination with a hydraulic conduit, of a valve mechanism comprising a casing having a valve seat, a movable valve element adapted to engage said seat, fluid actuated means for controlling movement of said valve element, including a passage which is always open and is adapted to conduct a constant supply of fluid to said actuated means, and means for controlling the constantly supplied fluid from said source automatically in accordance with operating conditions affecting flow in the upstream side of the conduit, whereby when said valve element is closed the pressure of the supplied fluid operating on said fluid actuated means is below normal.

47. The combination with a hydraulic conduit, of a valve mechanism comprising a casing having a valve seat, a movable valve element adapted to engage said seat, means to move said valve element in opening and closing directions including means adapted to hold said valve open by fluid pressure, and upon release of said opening pressure to permit said valve to close, fluid actuated means for controlling movement of said valve element, including a passage which is always open and is adapted to conduct a constant supply of fluid to said actuated means, and means for controlling said constantly supplied fluid, whereby when said constantly supplied fluid is operating on said actuated means under normal pressure said valve element is held open.

48. A valve mechanism comprising a casing having a seat, a movable valve element adapted to engage said seat, fluid pressure means for moving said element, axial fluid pressure means for variably controlling the fluid pressure of said latter means, and means for effecting operation of said moving means including a fluid supply passage which is always open.

49. A valve mechanism comprising a casing having a seat, a movable valve element adapted to engage said seat, fluid pressure means for moving said element, axial fluid pressure means for variably controlling the fluid pressure of said latter means, and means for effecting operation of said moving means including a fluid supply passage which is always open, and means whereby fluid through said passage is throttled.

50. A valve mechanism for a conduit comprising a casing having a seat, a movable valve element adapted to engage said seat, means for moving said element, means for controlling said latter means by fluid pressure, including a fluid supply passage which is always open, means whereby fluid through said passage is throttled, and means rendered operative in accordance with operating conditions affecting flow in the upstream side of the conduit for controlling the fluid after being throttled, whereby the same will reach a normal pressure when said valve element is open, and a reduced pressure when said valve element is closed.

51. A valve mechanism for a conduit comprising a casing having a seat and a movable valve element adapted to engage said seat, means forming opening and closing fluid pressure chambers for said valve element, a pipe leading from the opening chamber, a controlling valve disposed in said pipe adapted when open to permit fluid in said opening chamber to be discharged, thereby allowing said plunger to close, and means for effecting operation of said pipe valve including a solenoid adapted to be disenergized in advance of reversal of flow in said conduit.

52. A valve mechanism comprising a movable valve element fluid operated means including means forming closing and opening fluid chambers for said valve element, means for controlling said fluid operated means to close valve element automatically whenever the flow is reversed, comprising means to control the pressure automatically in one of said chambers, thereby to permit only a predetermined rate of valve movement substantially irrespective of the rate of flow velocity through said conduit, and an outlet for said opening chamber having a valve therein for controlling the same.

53. A valve mechanism comprising a movable hollow plunger, means forming closing and opening fluid chambers therefor, a longitudinally movable member having an interior passage one end of which terminates adjacent the front end of the hollow plunger while the other end communicates with the rear portion thereof, and an outlet for said opening chamber adapted to be opened upon the occurrence of predetermined operating conditions.

54. A valve mechanism as set forth in claim 40 wherein the plunger has telescopic relation with an interior casing which is spaced from the valve casing to form a relatively smooth annular fluid passageway, whereby the plunger moves substantially in the same direction as the axis of said passageway, and said plunger and interior casing forming an internal fluid chamber.

55. A valve mechanism as set forth in claim 40 wherein the plunger has telescopic relation with an interior casing which is spaced from the valve casing to form a relatively smooth annular fluid passageway, whereby the plunger moves substantially in the same direction as the axis of said passageway, and said plunger having associated therewith a piston whereby fluid pressure acting thereon can move said plunger in opposite directions.

56. A valve mechanism as set forth in claim 46, further characterized by having the valve element comprise a hollow plunger disposed in telescopic relation with an interior casing which is spaced from the valve casing to form a relatively smooth annular fluid passageway, and said plunger being movable substantially in the same direction as the axis of said passageway and forming with said interior casing an internal fluid chamber.

57. A valve mechanism as set forth in claim 46, further characterized by having the valve element comprise a hollow plunger disposed in telescopic relation with an interior casing which is spaced from the valve casing to form a relatively smooth annular fluid passageway, and said plunger being movable substantially in the same direction as the axis of said passageway and having associated therewith a piston upon which fluid pressure acts to move said plunger in opposite directions.

OTTO V. KRUSE.